United States Patent [19]
Johnson

[11] Patent Number: 5,276,950
[45] Date of Patent: Jan. 11, 1994

[54] CLOSURE STRIPS FOR BAGS

[76] Inventor: James R. Johnson, P.O. Box 47784, Atlanta, Ga. 30340

[21] Appl. No.: 892,779

[22] Filed: Jun. 3, 1992

Related U.S. Application Data

[62] Division of Ser. No. 636,663, Jan. 2, 1991, abandoned.

[51] Int. Cl.⁵ .............................................. B65D 33/24
[52] U.S. Cl. ......................................... 24/587; 24/400
[58] Field of Search ........................ 24/587, 399, 400; 383/63-65

[56] References Cited

U.S. PATENT DOCUMENTS 4,731,911 3/1988 Gould ................................... 24/587

Primary Examiner—James R. Brittain
Attorney, Agent, or Firm—James B. Middleton

[57] ABSTRACT

A string zipper, with no mounting flanges, is welded to bag material for forming zipper bags. The zipper material is fed from a driven unwind and the bag material receives the zipper material. Guides place the zipper material wherever desired with respect to the bag material. The bag material, with the zipper material, is held between continuously moving belts. Stationary heaters are places against the belts, and provide heat through the belts sufficient to weld the bag material to the zipper material. The zipper material is then heated as a preseal before the material is contacted by the side welding blade which completes the seal and separates discrete bags.

3 Claims, 3 Drawing Sheets

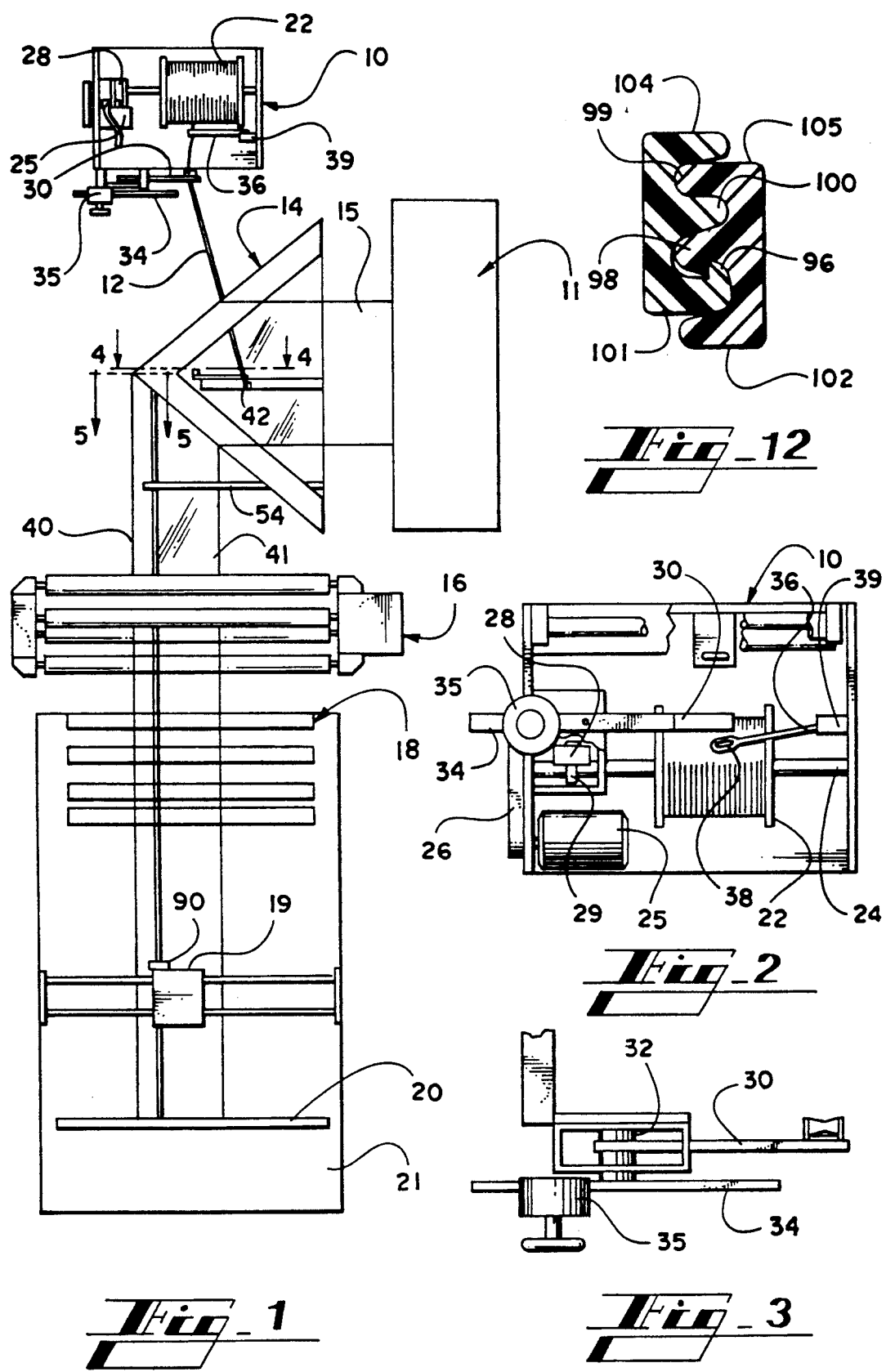

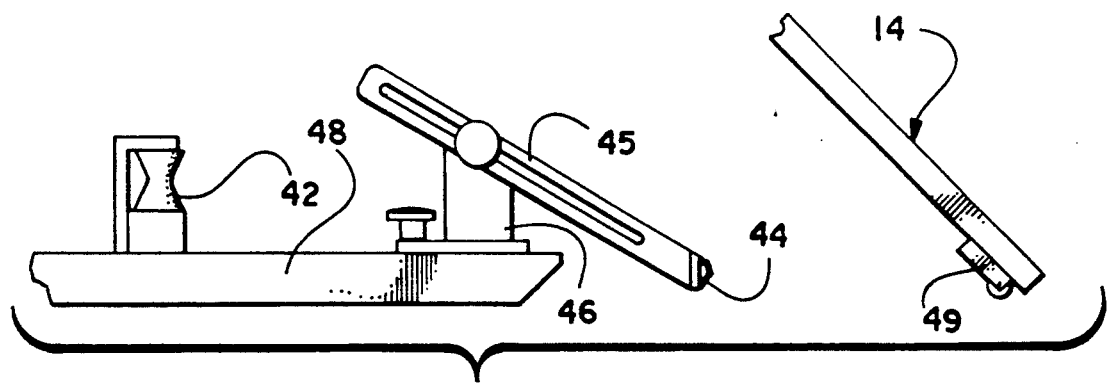
Fig_4
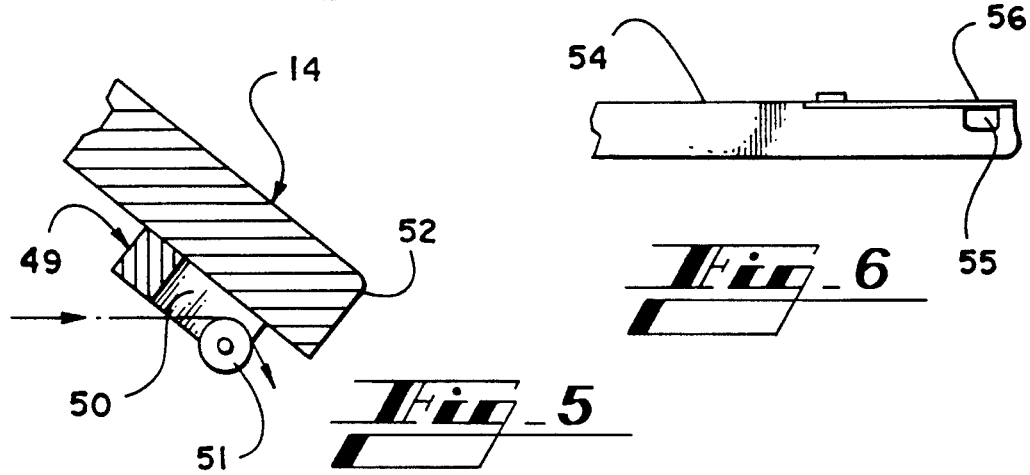
Fig_5
Fig_6
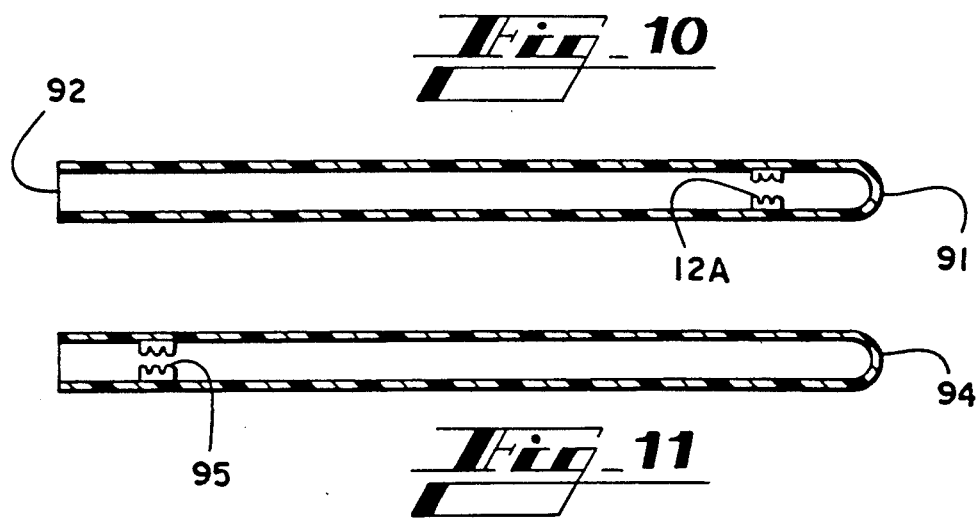
Fig_10
Fig_11

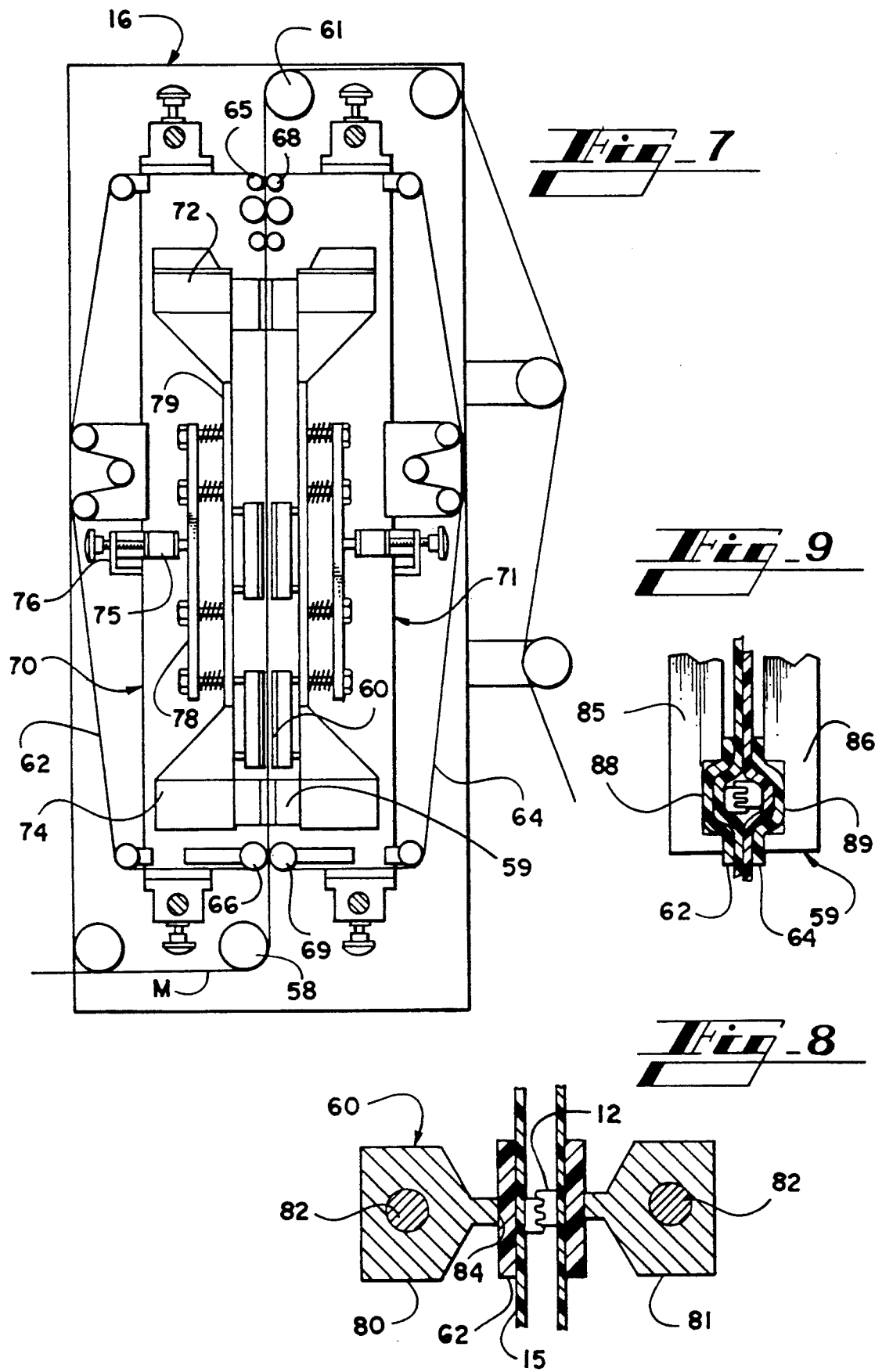

CLOSURE STRIPS FOR BAGS

CROSS REFERENCE TO RELATED APPLICATION

This application is a division of the copending application of the same inventor, filed Jan. 2, 1991, having Ser. No. 636,663, abandoned.

CROSS REFERENCE TO RELATED APPLICATION

Information Disclosure Statement

Interlocking closure strips are well known in the art. In the past, many of the closure strips have been formed integrally with the bag or other device, for example by extruding the bag material with the closure strips formed on the bag material. Other closure strips have been separately extruded, and subsequently fastened to a bag or the like. These separate closure strips typically have flanges extending therefrom so the flanges can be fixed to bag material in order to hold the closure strips to the material.

For some time, there have been closure strips that have an extremely small flange formed therewith. These closure strips are referred to as "string zippers", and provide a neater appearance, but of course it is more difficult to attach the string zipper because of the difficulty of handling and attaching the small flanges.

The integrally formed bag and closure strip has the neatest appearance, but the usual plastics converter cannot extrude his own bags with the closure. Thus, the converters utilize the separate closure strips, or zippers, to enable them to produce bags to customer specifications. It would therefore be desirable for a converter to be able to use a closure strip with no attaching flange in order to produce a neat bag, and to retain the flexibility of placing the closure strip on a bag of any desired configuration.

SUMMARY OF THE INVENTION

This invention relates generally to a method and apparatus for applying closure strips to bag material, and is more particularly concerned with the attaching of a string zipper with no flange to bag material.

The present invention provides apparatus for forming a bag, and placing a string zipper in the desired location within the bag. The bag material and the zipper are carefully held relative to each other while heat is applied through the bag material to the parts of the zipper for welding the bag material to the zipper. After the zipper is welded to the bag material, the bag material is side welded and separated along transverse lines for providing individual bags.

BRIEF DESCRIPTION OF THE DRAWINGS

These and other features and advantages of the present invention will become apparent from consideration of the following specification when taken in conjunction with the accompanying drawings in which:

FIG. 1 is a top plan view showing apparatus made in accordance with the present invention;

FIG. 2 is a front elevational view showing the zipper unwind for use in the apparatus of FIG. 1;

FIG. 3 is a fragmentary, top plan view showing the tensioning device for the zipper unwind shown in FIG. 2;

FIG. 4 is an enlarged, fragmentary cross-sectional view taken substantially along the line 4—4 in FIG. 1;

FIG. 5 is an enlarged, fragmentary cross-sectional view taken substantially along the line 5—5 in FIG. 1;

FIG. 6 is a fragmentary view showing a zipper guide for use in the apparatus of FIG. 1;

FIG. 7 is a side elevational view showing a sealing unit made in accordance with the present invention;

FIG. 8 an enlarged, fragmentary, cross-sectional view showing the sealing heads for use in the device of FIG. 7;

FIG. 9 is an enlarged top plan view showing one of the guides for use in the device of FIG. 7;

FIG. 10 is a longitudinal cross-sectional view through one form of bag with closure made with the apparatus of the present invention;

FIG. 11 is a longitudinal cross-sectional view through a different form of bag with closure made with the apparatus of the present invention; and, FIG. 12 is an enlarged, cross sectional view showing one configuration of closure strip to be used with the apparatus of the present invention.

DETAILED DESCRIPTION OF THE EMBODIMENT

Referring now more particularly to the drawings, and to that embodiment of the invention here chosen by way of illustration, the apparatus shown in FIG. 1 includes a zipper material unwind 10 and a sheet material unwind 11. The zipper material unwind 10 feeds the zipper material 12 to the sheet material folder 14, and the sheet material unwind 11 feeds sheet material 15 to the folder 14.

In the folder 14, the sheet material is folded in half to provide bag material, and the zipper material 12 is placed as desired. The material is then passed to the sealing unit generally designated at 16 where the zipper material 12 is welded to the bag material. Then, the material is passed through a tensioning device 18 and under a presealer 19. The presealer 19 heats the zipper material 12 and slightly flattens the zipper so the knife 20 in the bag machine 21 can effect a complete seal, and separate the individual bags.

As is well known to those skilled in the art, the bag material is in a continuous strip 15 until the material passes the knife 20. Predetermined lengths of bag material are fed past the knife 20, then the knife is lowered to separate a bag, and to weld the two edges at the cut. Individual bags are therefore discharged from the bag machine 21.

Looking at the structure in more detail, attention is directed to FIG. 2 of the drawings which shows the zipper material unwind 10. A spool of zipper material 12 is carried on a shaft 24, the spool 22 being fixed to the shaft 24 for rotation therewith. On the left end of the unwind 10 as viewed in FIGS. 1 and 2, there is a motor 25 which drives a belt 26; then, the belt 26 drives the shaft 24, so the unwind 10 is a driven unwind. The drive is important to prevent tight wrapping of the zipper material 12 on the spool 22.

It is also important not to allow the spool 22 to overrun, because coils of zipper material would be loose from the spool and may become entangled. To prevent overrunning of the spool 22, there is a brake 28. The brake 28 is a caliper style brake that engages a disk 29. The brake is air operated, and slight air pressure is maintained on the brake 28 to allow the unwind to be driven, but never to be freely turning.

The zipper material 12 needs to be kept under some tension so it will remain in the desired position with respect to the bag material 15. The tensioning device is shown in FIGS. 1 and 2, and is also shown in FIG. 3. The tensioning device for the zipper material includes an arm 30 carrying a roller guide 31. The arm 30 is fixed to a stub shaft 32, and the stub shaft 32 carries a tensioning arm 34 at its outer end. The tensioning arm 34 carries a weight 35 thereon, the weight 35 being movable along the length of the arm.

Looking especially at FIG. 3 of the drawings, it will be seen that, if the weight 35 is centered on the shaft 32, the weight 35 will not affect the rotation of the arm 34, or the arm 30. If the weight is moved to the right of the shaft 32, the weight will urge the arm 30 down; and, if the weight is moved to the left of the shaft 32, the weight will urge the arm 30 up. Thus, by placing the weight 35 on the arm 34, the arm 30 can be biased as desired to achieve the proper tension in the zipper material 12.

To prevent the spool 22 from feeding zipper material when it is not needed, there is a sensing switch to deactivate the unwind 10. A sensing arm 36 has an eye 38 in its extending end, while the opposite end is carried by a switch 39. If the zipper material 12 becomes slack, the arm 36 will fall, and this motion will act through the switch 39 to stop the motor 25. Once the zipper material is pulled taut, the arm 36 will be raised to energize the motor 25 and cause further feeding of zipper material 12 from the spool 22.

The sheet material unwind 11 is generally conventional and will be understood by those skilled in the art without a detailed description. The sheet material 15 is passed over a V-board 17, which is also conventional, and the sheet material is thereby folded substantially in half to provide bag material. As shown in FIG. 1, the edge 40 is the folded edge, and the edge 41 is the two raw edges of the material.

It will be obvious that, to utilize closure strips, or zippers, the zipper material 12 must be placed between the sides of the folded material 15. It should be further understood that some bags will require the zipper material to be close to the folded edge 40 and other bags will require the zipper material to be close to the raw edges 41. The desired placement is accomplished by the apparatus shown in FIGS. 4-6 of the drawings.

In FIG. 4, the roller guide 42 receives the zipper material 12 from the unwind 10 and guides the material to the adjustable eye 44. The eye 44 is at the end of a slotted arm 45, the slot allowing adjustment of the arm 45 with respect to the arm holder 46. Further, the arm holder 46 is selectively movable along the support 48. Since the arm holder 46 is movable along the support 48, and the slotted arm 45 is movable with respect to the arm holder 46, considerable adjustment is allowed for the placement of the eye 44. The zipper material 12 will then pass through the eye 44 and be placed as desired inside the bag material. The V-board 17 is shown in conjunction with the eye 44, so it will be understood that the eye 44 is used when the zipper material needs to be placed close to the ends of the bag material 15 rather than close to the folded edge.

If the zipper material 12 is to be placed close to the folded edge 40 of the bag material 15, the zipper material will be passed around the roller guide 42, then through the guide 49 fixed to the V-board 17. The guide 49 is shown more clearly in FIG. 5 where it can be seen that the guide 49 includes slot 50 for receiving the zipper material 12, and a roller 51 for smoothly directing the zipper material down. Since the folded edge of the bag material 15 comes off the apex 52 of the V-board 17, it will be recognized that the zipper material 12 will be placed quite close to the folded edge of the bag material 15.

After the zipper material 12 is placed within the folded bag material, the zipper needs to be held to retain the proper position. A guide 54 is therefore provided between the apex 52 of the V-board 17 and the sealer 16. The end of the guide 54 is shown in FIG. 6 and it will be observed that the guide 54 includes a notch 55 closed by a cover member 56. The cover member 56 is selectively removable to allow the zipper material to be easily placed into the notch 55.

The bag material 15 with the inserted zipper material 12 next enters the sealer 16, the construction of the sealer 16 being shown in detail in FIGS. 7-9. It should be understood that, in general, the bag material and zipper material are held relative to each other, and heat is applied to the bag material sufficiently to weld the bag material to the zipper material.

In more detail, and looking at FIG. 7 of the drawings, the bag material, with the zipper material included, is designated at M, and passes over a roller 58 to redirect the material M vertically. The material M passes through alignment securing guide 59, then through heat sealer 60. There is another alignment securing guide 59, and another heat sealer 60, followed by another alignment securing guide 59. The material M then passes over rollers 61 and out of the sealing unit 16.

Throughout the path of the material M through the sealer 16, the material has belts 62 and 64 on each side thereof. The belt 62 extends through the path previously described, over rollers 65 and 66, and around to return to the path. Thus, the belt 62 is continuous, and continuously runs through the path with the material M. Similarly the belt 64 passes through the path, around rollers 68 and 69, and around the device to return to the path. It should therefore be understood that the belts 62 and 64 bear directly against the material M to protect the material M from damage due to direct contact with the sealers 60 or the guides 59.

As shown in FIG. 7, the sealer is in position to seal the bag material to the zipper material. Those skilled in the art, however, will understand that, if the material M stops moving, the material would be damaged by having the sealers 60 in contact with the material. The guides and sealers along the path are therefore movable to open the path. This allows easy threading of the system and protects the material in the event the system stops.

The sealer 16 includes two support members 70 and 71, each support member 70 and 71 carrying one half of the sealers 60 and guides 59. The support member 70 is mounted on slide bearings 72 and 74 so the member 70 can move left to right as shown in the drawings. To move the support member 70, an air cylinder 75 is fixed between a bracket 76 and a bar 78. The bar 78 is resiliently fixed with respect to the flange 79 which is fixed to the member 70. As a result, the air cylinder 75 will resiliently urge the guides 59 and sealers 60 towards the mating pieces.

The support member 71 is a mirror image of the support member 70, and the above description will not be repeated.

Attention is directed to FIG. 8 of the drawings which shows the heat sealer 60 in more detail. Those skilled in the art will recognize that there are conventional sealing bars 80 and 81 having electric heaters 82. The sealing surface 84 is flat, and is of substantially the same width as the zipper material 12. The two sealing bars are mirror images of each other, each bar being arranged to weld bag material 14 to one strip of the zipper material 12.

The sealing surface 84 of the sealing bar 80 is immediately against the belt 62. The belt 62 is made of polytetraflouroethylene (PTFE) or other material that can withstand the temperatures required, and that offers little frictional resistance as it slides across the surface 84. Heat is therefore transferred through the belt 62 and to the bag material 15. Since the surface 84 is about the same width as the zipper material 12, the plastic only in this area will be heated enough to create a weld between the bag material 15 and the zipper material 12. Simultaneously, the sealing bar 81 will also seal the opposite side of the bag material 15 to the opposite side of the zipper material 12.

Looking briefly at FIG. 9, the guides 59 comprise rigid bars 85 and 86 which define notches 88 and 89 therein. The notches 88 and 89 are sized to receive the zipper material 12 with the belts 62 and 64 and the bag material 15. The pressure between the bars 85 and 86 is light enough to allow the belts 62 and 64 to move therebetween while securing the location of the zipper material 12 with respect to the bag material 15.

After the zipper material 12 has been welded to the bag material 14, the material M passes through a dancer arrangement 18 which assures proper tension on the material while allowing the stopping and starting of the bag machine 21. The material M passes under a presealer 19 which uses ultrasonic energy directed through a horn 90 to heat the area of the zipper between adjacent bags.

When transverse lines are welded across the material M to create separate bags, the conventional knife 20 performs quite well on the bag material, but cannot perform an adequate seal on the zipper material 12. Thus, the sonic horn 90 heats the zipper material, and the zipper is partially flattened preparatory to the final side welding operation. The horn 90 is close enough to the blade 20 that the zipper material will still be slightly soft from the presealing operation, so the side welding blade 20 will provide an excellent side weld on the entire edge of the bag.

The bag machine 21 is not illustrated in any detail, but operation will be well understood by those skilled in the art without further discussion.

Attention is directed to FIGS. 10 and 11 which show two bags that may be made with the present invention.

The bag of FIG. 10 has the zipper 12A adjacent to the closed end 91 of the bag. Bags of this type are used by filling the bag through the open end 92, then heat sealing the end 92 closed. This is of course done with the zipper parts engaged, thereby providing a completely sealed package. The consumer, then, cuts the edge 91 off, then has a reclosable bag for keeping the contents during use.

The bag of FIG. 11 is conventional in that the folded edge 94 of the bag material is the bottom of the bag, and the zipper 12B is adjacent to the raw edges of the bag material. A conventional zipper bag is therefore provided.

Those skilled in the art will be aware that many zipper configurations are available, and any string zipper can be used with the present invention. By way of example, however, the zipper shown in FIG. 12 includes a pair of complementary hooks 96 and 98 that are selectively engageable. Fingers 99 and 100 act as alignment means both to assist in locking the zipper and in providing strength to the zipper.

It will be noticed that, if one attempt to open the zipper of FIG. 12 by pulling apart the ends 101 and 102, the hooks 96 and 98 will directly resist the force, making the zipper hard to open. On the other hand, if the ends 104 and 105 are pulled apart, the hook 98 can slide away from the hook 96 so the zipper will be rather easy to open. One would therefore place the ends 104 and 105 towards the external lips of the completed bag for easy opening.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A zipper for use as a closure strip on bag material, said zipper including a first strip and a second strip that can be selectively interlocked with each other, said first strip having a first end and a second end, a base, a plurality of fingers extending from said base, said plurality of fingers including a first hooked finger at said first end, a second straight finger at said second end, and a central straight finger between said first finger and said second finger, said first hooked finger including a hook facing said central finger, said second strip having a first end and a second end, a base, and a plurality of fingers extending from said base, said plurality of fingers including a first straight finger at said first end, a second straight finger at said second end, and a central hooked finger between said first finger and said second finger, said central hooked finger including a hook facing said first straight finger, said first strip and said second strip being oriented so that said first end of said first strip is adjacent to said first end of said second strip, said first hooked finger of said first strip being receivable between said straight first finger and said hooked central finger of said second strip so that said hook of said first hooked finger and said hook of said central hooked finger interengage to lock said first end of said first strip and said second strip together, said central straight finger of said first strip being receivable between said central hooked finger and said straight second finger of said second strip to allow separation of said second end of said first strip and said second strip.

2. A zipper as claimed in claim 1, said base constituting means for attaching said zipper to bag material.

3. A zipper as claimed in claim 2, said zipper being oriented with respect to said bag material so that said first end is towards the inside of a bag formed from said bag material, and said second end is towards the outside of a bag to be formed from said bag material.

* * * * *